Dec. 18, 1923.
A. T. SAMPSON
1,478,066
LIGHTING AND POWER FIXTURE
Filed Feb. 19, 1920     2 Sheets-Sheet 1
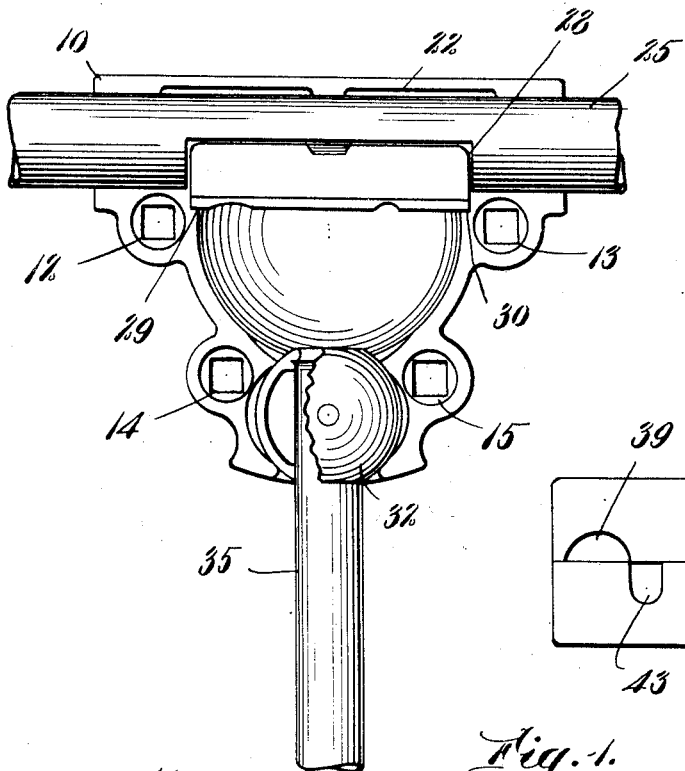
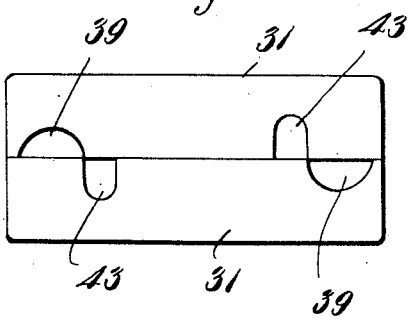
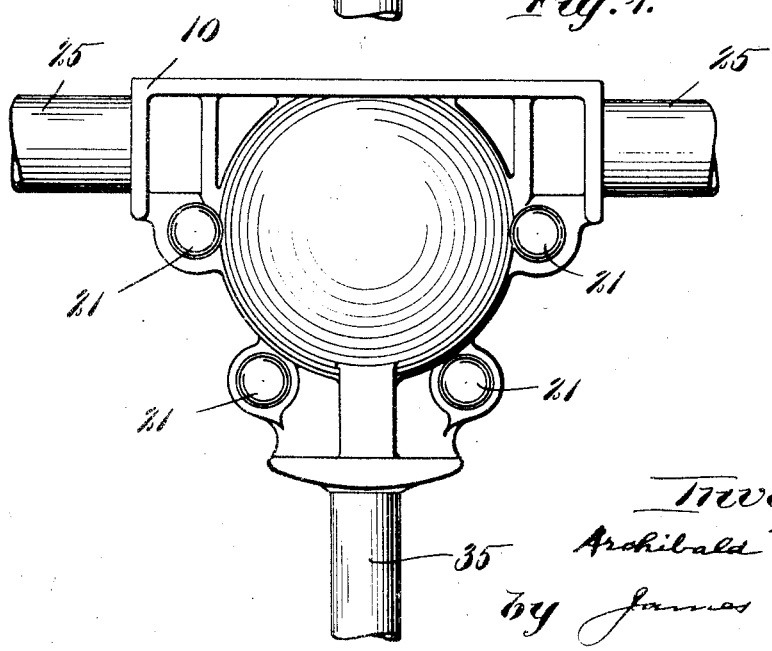
Inventor:
Archibald T. Sampson
by James R. Hodder
att'y.

Dec. 18, 1923.
A. T. SAMPSON
LIGHTING AND POWER FIXTURE
Filed Feb. 19, 1920      2 Sheets-Sheet 2
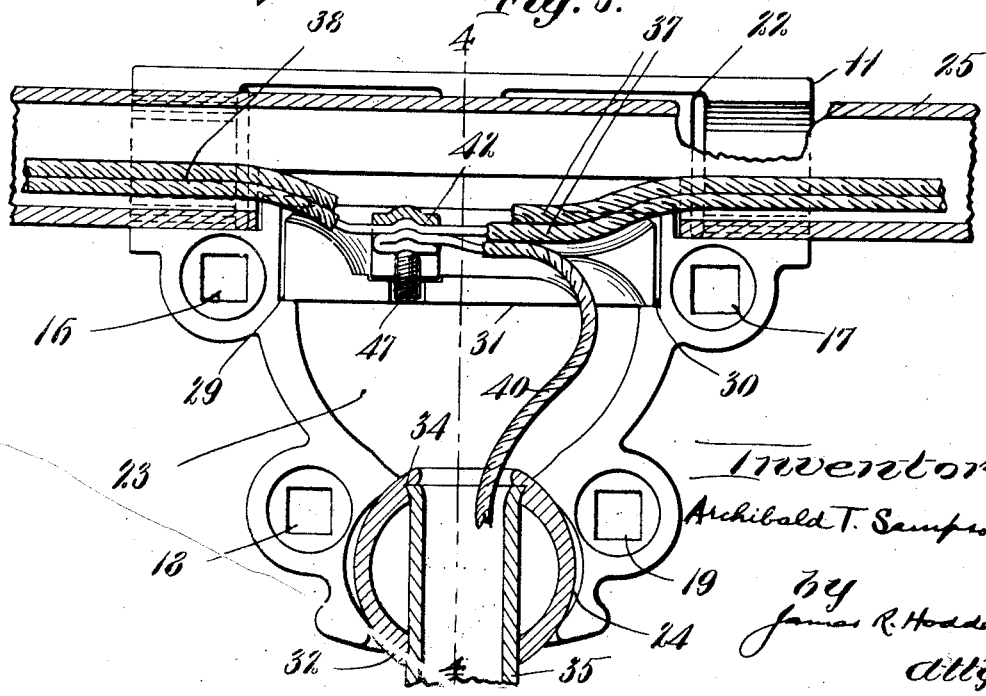

Patented Dec. 18, 1923.

1,478,066

UNITED STATES PATENT OFFICE.

ARCHIBALD T. SAMPSON, OF LYNN, MASSACHUSETTS, ASSIGNOR TO SAMPSON AXCESS SYSTEM, INC., OF LYNN, MASSACHUSETTS, A CORPORATION OF MASSACHUSETTS.

LIGHTING AND POWER FIXTURE.

Application filed February 19, 1920. Serial No. 359,903.

*To all whom it may concern:*

Be it known that I, ARCHIBALD T. SAMPSON, a citizen of the United States, and a resident of Lynn, Massachusetts (whose post-office address is No. 434 Union Street, Lynn, Massachusetts), have invented an Improvement in Lighting and Power Fixtures, of which the following description, in connection with the accompanying drawings, is a specification, like letters on the drawings representing like parts.

My present invention relates to lighting and power fixtures, and more particularly to lighting and power fixtures adapted to be installed in and connected to existing lighting and power circuits.

In my copending applications, Serial No. 318,036, filed Aug. 16, 1919, and Serial No. 295,747, I have described and claimed cutting apparatus for removing a section of a wiring conduit already in position in a building or other structure, for the purpose of exposing to view a short length of the enclosed conductor, in order that connection may be made thereto.

In wiring systems that are already installed in a building or other structure, it is desirable not only that it be possible to tap the wires at any point without tearing out and re-installing a portion of the system, but that the apparatus to be connected in the system at the tapping point be of the simplest character possible. That is, bulky and expensive junction boxes that have to be attached to the wall or ceiling of the building and which necessitate additional conduit installation from the tapping point to the junction box, are to be avoided where simplicity and rigidity of construction are desirable or essential. As, in the majority of installations, the conduits are placed close to the ceiling, and as a large percentage of the fixtures to be added to the installation are hung from the ceiling, it will be apparent that the fixtures in use at the present day are bulky, clumsy, and expensive. In factories and large mercantile establishments it will be found that the majority of fixtures added to the wiring system consist of drop lights, and in these establishments particularly, the drop lights must necessarily be of the most rigid character, and yet be capable of movement within wide limits, and with the least exertion. Particularly is this true in the case of a factory, such as a machine shop, where the fixture, to stand the abuse which it seems it is necessary to subject them to, must be rigid enough to stand up in use, and yet be capable of being readily adjusted and swung out of the way when not in use.

In carrying out my invention, I have devised the terminal box to be used in combination with a ball and socket joint, as a majority of the fixtures to be attached to the wiring system are portable or semi-portable in character, as lamps, irons, etc. With such fixtures, and particularly lamps, it is desirable that they be capable of being adjusted with respect to the terminal box, within wide limits. The ordinary universal joint will not answer the purpose, and it was necessary to devise a ball and socket joint to which a depending conduit could be readily and securely attached, the conduit (and attached fixture) capable of adjustment with respect to the terminal box, and which would remain in its adjusted position. To use a ball that would successfully perform the functions enumerated, such ball must be split to properly clamp the depending conduit in position, and means must be provided to hold the two halves of the ball in clamping engagement. As the depending pipe holding the fixture is utilized to adjust the fixture, considerable strain is at times placed on such pipe. I avoid the breaking of the pipe at its connection with the ball by extending the pipe substantially through the ball and upsetting the end of the pipe which upset end registers with a circumferential groove in the interior of the ball and assists in retaining the pipe in position. Again, by this means, the pipe bearing on the ball at diametrically arranged points, providing a fulcrum that tends to tighten the ball in the socket.

I obviate the difficulties enumerated above by the use of an improved and simple terminal box composed of few parts, and which may be readily and securely attached to a conduit or pipe at any desired point. In connection with this terminal box I employ an improved block, of porcelain or any other desired material, and through which the main conductors of the wiring system, at tapping point, are led. The use of such block in connection with the terminal box insures that the main or through conductors are not disturbed, and therefore no strain is placed thereon, the tap wire is anchored, while the connection between the main and tap wires is locking in the block in such a way that it is not subject to any bending movement that would be likely to displace the connector.

Another object is the provision of an improved connector for use in connection with the terminal box.

A further object is the provision of an improved form of ball and socket joint.

A still further object, and one relating to the last named object, is an improved clamping means associated with the ball element of the ball and socket joint.

A further object is an improved means for turning the ball in the socket.

An object of my present invention therefore, is an improved fixture for lighting and power circuits, which is simple in construction, readily applied at any point of a conduit, and in which the electrical connections are simplified and protected.

In carrying out my invention, I contemplate its use in an improved system of electrical installation, such as that described and claimed in my copending application, Ser. No. 166813, filed may 7/17, in which installations the cutting apparatuses of the above referred to copending applications perform operations on the conduits employed in said systems that permit the fixture of the present invention to be readily incorporated in the system.

In the accompanying drawings, illustrating the preferred embodiment of my invention, Fig. 1 is a view in elevation;

Fig. 2 is a sectional view, with the ball and socket joint partly in elevation.

Fig. 3 is a sectional view.

Fig. 4 is a sectional view, taken on the line 4—4 of Fig. 3, and in the direction of the arrow, Fig. 5 is a plan view of a pair of insulating anchor blocks or connectors, Fig. 6 is an elevation of one of the insulating anchor blocks or connectors, showing the passageways for the main and branch conductors, and for the connector, Fig. 7 is a sectional view of the connector, and Fig. 8 is an elevational view of the connector.

Referring to the drawings, 10 and 11 designate body members, the member 10 being provided with perforations 12, 13, 14 and 15 in alignment with the perforations 16, 17, 18 and 19 respectively, in the member 11. The perforations are square, to receive the squared shoulder of the bolts 21, which bolts are provided with nuts (not shown) for clamping the members 10 and 11 together. By making the perforations square I simplify manufacture, and make it possible to insert the bolts 21 from either side of the assembled fixture.

Each of the members 10 and 11 are provided with a longitudinal semi-cylindrical passage 22 at the upper end, a centrally located depression 23, and a hemispherical depression 24 at the lower end. When the members 10 and 11 are assembled the passages 22 define a cylindrical passage of approximately the same diameter as the main conduit 25, to which they are to be attached, the depressions 23 a spherical chamber, and the depressions 24 a second smaller spherical chamber. On the bottom of each depression 24 is a groove 26 acting as a retaining guide for the purpose to be hereinafter described.

Separating the passage 22 from the central depression 23 is a wall or fin 27 which engages with the wall of the cut-away portion 28 of the main conduit 25, preventing rotary and longitudinal movement of the members 10 and 11 thereon. Immediately below the wall or fin 27 and in the depression 23, the walls of the members 10 and 11 are cut away to form end supports 29 and 30 for the porcelain connectors 31, which are thus held in position relative to the members 10 and 11 and the main conduit 25.

In the cylindrical chamber formed at the bottom of the members 10 and 11 by the depressions 24, are fitted semi-cylindrical ball joints 32 which are provided on the exterior with projections 33 which register with the grooves 26. The ball joints are hollow as shown, and are provided with cooperating grooves 34 at the upper end to receive and hold the expanded end of the branch conduit 35. This branch conduit 35 passes downward through the ball joints 32 and is of any suitable or desired diameter and length. The branch wire or wires 40 pass through the branch conduit 35 and are connected to any suitable fixture (not shown) which is mounted on or attached to the lower end of said conduit. To adjust the fixture into any desired position, the ball joints 32 are rotated or otherwise moved relatively to the cylindrical chamber formed at the bottom of the members 10 and 11. The branch conduit 35, being fastened in the ball joints 32, has a limited angular movement with respect to a vertical plane and a movement through 360 degrees with respect to a horizontal plane.

As the branch conduit 35 passes substantially through the ball joints 32, it will be obvious that considerable force may be exerted on the conduit 35 to adjust the fixture on the end thereof without danger of breaking the connection between the conduit and the ball joints, and that the fulcrum of the pipe is substantially equal to the diameter of the ball joint. Further, that as pressure is exerted on the conduit 35 there is a tendency to spread the members 32 apart and into engagement with the members 10 and 11. Such a tendency helps to hold the conduit and associated fixture in adjusted position.

The porcelain connectors 31 are of a length substantially that of the distance between the end supports 29 and 30 and are provided along one edge with a lip 36 which bears against the wall or fin 27. Further, each connector 31 is provided with a longitudinal groove 52 on one face, in which may be placed one of the main conductors 37 of the lighting or power cable 38 in the main conduit 25. On the same side of the connector as the groove 52, but on the lower face, is an auxiliary groove 39 which merges with the groove 52 and is adapted to receive the tap or branch conductor 40, which leads downward through the branch conduit 35 to a light or other electricity consuming device. On the same side of the connector as the grooves 52 and 39 and intermediate the ends of the groove 52 is a depression 41, of suitable size and shape to receive the binding posts 42, shown in Figs. 7 and 8. A passage 43 through the lower face of the connector connects with the depression 41. The binding post 42 is composed of a section of material having a rib 44 thereon, and which section is folded upon itself to define a passage 45 between folds, and a cylindrical passage 46 in alignment with the ribs 44. This passage 46 is threaded to receive a slotted headless screw 47, which, when the binding post is placed in position in the depression 41, extends into the passageway 43. When placed in position, as shown in Fig. 4, the faces containing the grooves 52 and 39 are in engagement, and by referring to Fig. 5, it will be seen that the connectors "break joints"; that is, the auxiliary passages 39 and the passages 43 in each connector are placed oposite a blank portion of the face of the other connector. This arrangement provides against derangement of the main or branch conductors, or the binding posts 42.

To tap the cable 38 at any desired point, the cutting apparatus described and claimed in my copending applications above referred to, are employed to remove a portion of the main conduit 25. This operation exposes a short section of the cable 38 and the insulation is removed therefrom, exposing the conductors 37. Such exposed portion of the conductors 37 are cleaned in the usual manner, a binding post 42 slipped onto the wire, after first removing the screw 47, the end of the branch conductor 40, from which the insulation has been removed and the conductor cleaned, is folded back upon itself, as shown in Fig. 3, and placed in the binding post 42 in contact with the main conductor 37 and both the main and branch conductors clamped together by the screw 47. The member 10, or 11, is now placed on one side of, or under, as shown in Fig. 3, the conduit 25, with the cut out portion of the conduit in engagement with the walls or fin 27. This fin 27 has a rounded edge, forming a protection against the sharp corner of the cut in the pipe, and surrounds the cut out portions of the conduit 25. An insulating anchor block or connector 31 is now placed under one of the main conductors in position to allow the binding post 42 to fit into the depression 41, with the screw 47 registering with the passage 43, and with the connector 31 itself in position on the end supports 29 and 30. It is assumed of course, that the branch conductors 40 are encased, except for the exposed ends, in the branch conduit, which is now placed in position on one of the hemispherical joints 32, which in turn is placed in the depression 24, with the projection 33 registering with the groove 26. Another porcelain connector 31 is now placed against the one already in position, with the depression 41 therein registering with the binding post 42 on the second main conductor, a second hemispherical joint placed on the first to engage with the flared end of the branch conduit 35, and the member 11, or 10, placed in position on the member 10, or 11, cooperating projections and notches being provided to insure that the connectors 42 and hemispherical joints are not disturbed. Bolts 21 are now placed through the alined perforations 12—16, 13—17, 14—18 and 15—19, when the bolts and nuts (not shown) unite the elements described into a unitary structure.

With the parts in position, as above described, the fixture is securely held on the main conduit against either rotary or longitudinal movement, and the hemispherical joints may be clamped by the members 10 and 11 with any desired degree of pressure, split spring washers being used in connection with the bolts 21 to retain said bolts in position and to give automatic yielding tension on the ball. Further, the branch conduit may be swung in a circular arc that is only limited by the conduit striking against the lower part of the members 10 and 11.

The entire fixture is substantial in every respect to withstand the severe usage to which such type of fixtures is subjected, all parts are simple in construction and the device may be readily installed in existing power and lighting circuits.

While I have shown and described the preferred embodiment of my invention, it is to be understood that I may vary the size, shape, and arrangement of elements constituting the device within reasonably wide limits without departing from the spirit of the invention.

Having thus described my invention, what I claim as new and desire to secure by Letters Patent, is:—

1. In a device of the class described, the combination of a pair of cooperating members each containing a plurality of depressions defining, a conduit receiving, a wire terminal, and a ball joint, chamber, respectively, and means for clamping said cooperating members together.

2. In a device of the class described, the combination of a pair of cooperating members each containing a plurality of depressions defining a conduit receiving, a wire terminal, and a ball joint chamber, respectively, means in said conduit receiving chamber for engaging with a conduit to prevent rotary and longitudinal movement of the cooperating members on the conduit, and means for clamping said cooperating members together.

3. In a device of the class described, the combination of a pair of cooperating members each containing a plurality of depressions defining a conduit receiving, a wire terminal, and a ball joint chamber, respectively, cooperating ball joint members in said ball joint chamber, a branch conduit, and means in said ball joint members for holding the branch conduit in position in the ball joint members against removal therefrom, and means for clamping said cooperating members together.

4. In a device of the class described, the combination of a pair of cooperating members each containing a plurality of depressions defining a conduit receiving, a wire terminal, and a ball joint chamber, respectively, supporting members in the wire terminal chamber, porcelain insulating anchor blocks engaging with the supporting members, and means for clamping said cooperating members together to retain the porcelain insulating anchor blocks in position on the supporting members.

5. In a device of the class described, the combination of a main conduit carrying a plurality of conductors and having a portion thereof removed to expose the conductors, a pair of cooperating members defining a passage surrounding the main conduit at the cutaway portion, means on each of the members for engaging the main conduit and preventing rotary and longitudinal movement of the members thereon, connectors, one for each of the conductors, held in position on its respective conductor by the cooperating members, a branch conduit carrying a plurality of conductors extending beyond the end thereof, means for connecting the branch conductors to the main conductors, a ball joint having means for holding the end of the branch conduit, a socket for holding the ball joint, and means for clamping the cooperating members together with any desired degree of pressure, whereby the pressure on the ball and socket joint may be regulated.

6. In combination, a conduit having an opening in the side thereof, an outlet box surrounding the conduit adjacent said opening, inwardly extending fins on said outlet box engaging the opening in said conduit, whereby the box is held securely in place, and the conduit reinforced.

In testimony whereof, I have signed my name to this specification, in the presence of two subscribing witnesses.

ARCHIBALD T. SAMPSON.

Witnesses:
 HAROLD J. CLARK,
 JAMES R. HODDER.